US012130608B2

(12) United States Patent
Panikkar et al.

(10) Patent No.: US 12,130,608 B2
(45) Date of Patent: Oct. 29, 2024

(54) DETERMINING OPTIMAL OF ADDITIVE MANUFACTURING AND/OR THREE DIMENSIONAL PRINTING PROCESSES

(71) Applicant: International Business Machines Corporation, Armonk, NY (US)

(72) Inventors: Sanjay Bhaskara Panikkar, Bangalore (IN); Mukundan Sundararajan, Bangalore (IN); Saikat Mukhopadhyay, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 26 days.

(21) Appl. No.: 17/643,709

(22) Filed: Dec. 10, 2021

(65) Prior Publication Data

US 2023/0185276 A1    Jun. 15, 2023

(51) Int. Cl.
  *G05B 19/4099*  (2006.01)
  *B29C 64/386*  (2017.01)
  *B33Y 50/00*  (2015.01)

(52) U.S. Cl.
  CPC ........ *G05B 19/4099* (2013.01); *B29C 64/386* (2017.08); *B33Y 50/00* (2014.12); *G05B 2219/49007* (2013.01)

(58) Field of Classification Search
  CPC ...... G05B 19/4099; G05B 2219/49007; B33Y 50/00; B29C 64/386
  See application file for complete search history.

(56) References Cited

U.S. PATENT DOCUMENTS

| 4,543,020 | A | * | 9/1985 | Shtipelman | ............... | B23F 5/14 |
| | | | | | | 409/12 |
| 5,580,298 | A | * | 12/1996 | Stadtfeld | ............... | B23F 23/006 |
| | | | | | | 451/5 |
| 2007/0060022 | A1 | * | 3/2007 | Wirz | ....................... | B23F 23/04 |
| | | | | | | 451/5 |
| 2010/0111628 | A1 | * | 5/2010 | Megens | .................. | B23F 17/00 |
| | | | | | | 409/27 |
| 2017/0068238 | A1 | | 3/2017 | High | | |

(Continued)

FOREIGN PATENT DOCUMENTS

| CN | 112139495 | * | 12/2020 |
| CN | 213511964 U | * | 6/2021 |
| CN | 116252483 A | | 6/2023 |

OTHER PUBLICATIONS

"Yip, 3D printing gear part manufacture by adopting die steel, 2021, google patents, note this is a machine translation of CN213511964U" (Year: 2021).*

(Continued)

*Primary Examiner* — Robert E Fennema
*Assistant Examiner* — Yvonne Trang Follansbee
(74) *Attorney, Agent, or Firm* — Michael A. Petrocelli; Andrew D. Wright; Calderon Safran & Wright P.C.

(57) ABSTRACT

Machine logic (for example, software) are choosing among pre-existing manufacturing processes to make a newly-designed physical piece part, or a piece part that reflects a modified design with respect to an earlier design. In some embodiments, the manufacturing process includes an additive manufacturing (AM) process. In some embodiments, the manufacturing process involves three dimensional (3D) printing.

4 Claims, 4 Drawing Sheets

(56) References Cited

U.S. PATENT DOCUMENTS

| | | | |
|---|---|---|---|
| 2018/0326547 A1* | 11/2018 | Stadtfeld | B22F 10/22 |
| 2019/0278878 A1* | 9/2019 | Sawyer | G06F 21/602 |
| 2020/0073850 A1 | 3/2020 | Roychowdhury | |
| 2020/0376776 A1 | 12/2020 | Karandikar | |
| 2020/0387652 A1* | 12/2020 | Taber | G06F 30/23 |
| 2021/0034037 A1 | 2/2021 | Rangarajan | |
| 2021/0086451 A1 | 3/2021 | Carbone | |
| 2021/0331906 A1* | 10/2021 | Turnbull | B66F 9/07572 |
| 2021/0362242 A1* | 11/2021 | Storck | B33Y 10/00 |
| 2022/0108051 A1* | 4/2022 | Liu | G06F 30/27 |
| 2022/0164503 A1* | 5/2022 | Singh | G06F 30/15 |
| 2022/0235613 A1* | 7/2022 | Voglewede | E21B 10/54 |
| 2024/0100247 A1* | 3/2024 | Pirbodaghi | A61M 5/16881 |

OTHER PUBLICATIONS

Wu, Method for repairing broken teeth of gear through additive manufacturing, 2020, google patents, note this is a machine translation of CN112139495A (Year: 2020).*

"Global Additive Manufacturing Market and Technology Forecast to 2028", Downloaded from the Internet on Jun. 16, 2021, Copyright @ 2002-2021 Research and Markets, 5 pgs., <https://www.researchandmarkets.com/reports/5144559/ global-additive-manufacturing-market-and?utm_source=GNOM&utm_medium=PressRelease&utm_code=6x65xh&utm campaign=1438618+-+Global+Additive+Manufacturing+Market+and+Technology+Forecast+2020- +2028&utm_exec=cari18prd>.

* cited by examiner

DETERMINING OPTIMAL OF ADDITIVE MANUFACTURING AND/OR THREE DIMENSIONAL PRINTING PROCESSES

BACKGROUND

The present invention relates generally to the field of additive manufacturing design, and more particularly to applying this design in the marketplace.

The Wikipedia entry for "Additive Manufacturing" (as of Jun. 21, 2021) states, in part, as follows: "3D printing, or additive manufacturing, is the construction of a three-dimensional object from a CAD model or a digital 3D model. The term '3D printing' can refer to a variety of processes in which material is deposited, joined or solidified under computer control to create a three-dimensional object, with material being added together (such as plastics, liquids or powder grains being fused together), typically layer by layer. . . . One of the key advantages of 3D printing is the ability to produce very complex shapes or geometries that would be otherwise impossible to construct by hand, including hollow parts or parts with internal truss structures to reduce weight . . . . The umbrella term additive manufacturing (AM) gained popularity in the 2000s, inspired by the theme of material being added together (in any of various ways) . . . . The term 3D printing still referred only to the polymer technologies in most minds, and the term AM was more likely to be used in metalworking and end-use part production contexts than among polymer, inkjet, or stereolithography enthusiasts. Inkjet was the least familiar technology even though it was invented in 1950 and poorly understood because of its complex nature. . . . Until recently, the term 3D printing has been associated with machines low in price or in capability. 3D printing and additive manufacturing reflect that the technologies share the theme of material addition or joining throughout a 3D work envelope under automated control. (footnote(s) omitted)

According to the Additive Manufacturing Research Group at Loughborough University as of Jul. 12, 2021: "Although media likes to use the term "3D Printing" as a synonym for all Additive Manufacturing processes, there are actually lots of individual processes which vary in their method of layer manufacturing. Individual processes will differ depending on the material and machine technology used."

At present, at least seven extant types of additive manufacturing (AM) have been identified as follows: vat photopolymerization, material jetting, binder jetting, material extrusion, powder bed fusion, sheet lamination and directed energy deposition. It is noted that "additive manufacturing," as that term is used herein, may involve a combination of these types, a combination of AM with traditional manufacturing technique and/or other types of AM not explicitly mentioned here.

SUMMARY

According to an aspect of the present invention, there is a method, computer program product and/or system that performs the following operations (not necessarily in the following order): (i) receiving a product specification data set including information indicative of a design of a physical product; (ii) receiving a plurality of manufacturing process data sets respectively including information indicative of a manufacturing process that may be used to manufacture the physical product such that the plurality of manufacturing process data sets correspond to a plurality of manufacturing processes; and (iii) selecting, by machine logic, an optimal manufacturing process from the plurality of manufacturing processes.

According to an aspect of the present invention, there is a method, computer program product and/or system that performs the following operations (not necessarily in the following order): (i) receiving a product specification data set including information indicative of a design of a physical product; (ii) receiving a plurality of manufacturing process data sets respectively including information indicative of a manufacturing process that may be used to manufacture the physical product such that the plurality of manufacturing process data sets correspond to a plurality of manufacturing processes; and (iii) selecting, by machine logic, an optimal manufacturing process from the plurality of manufacturing processes; wherein the optimal manufacturing process includes at least one additive manufacturing (AM) operation.

According to an aspect of the present invention, there is a method, computer program product and/or system that performs the following operations (not necessarily in the following order): (i) receiving a product specification data set including information indicative of a design of a physical product; (ii) receiving a plurality of manufacturing process data sets respectively including information indicative of a manufacturing process that may be used to manufacture the physical product such that the plurality of manufacturing process data sets correspond to a plurality of manufacturing processes; and (iii) selecting, by machine logic, an optimal manufacturing process from the plurality of manufacturing processes; wherein the optimal manufacturing process includes at least one three dimensional (3D) printing operation.

DETAILED DESCRIPTION

Figure 1:
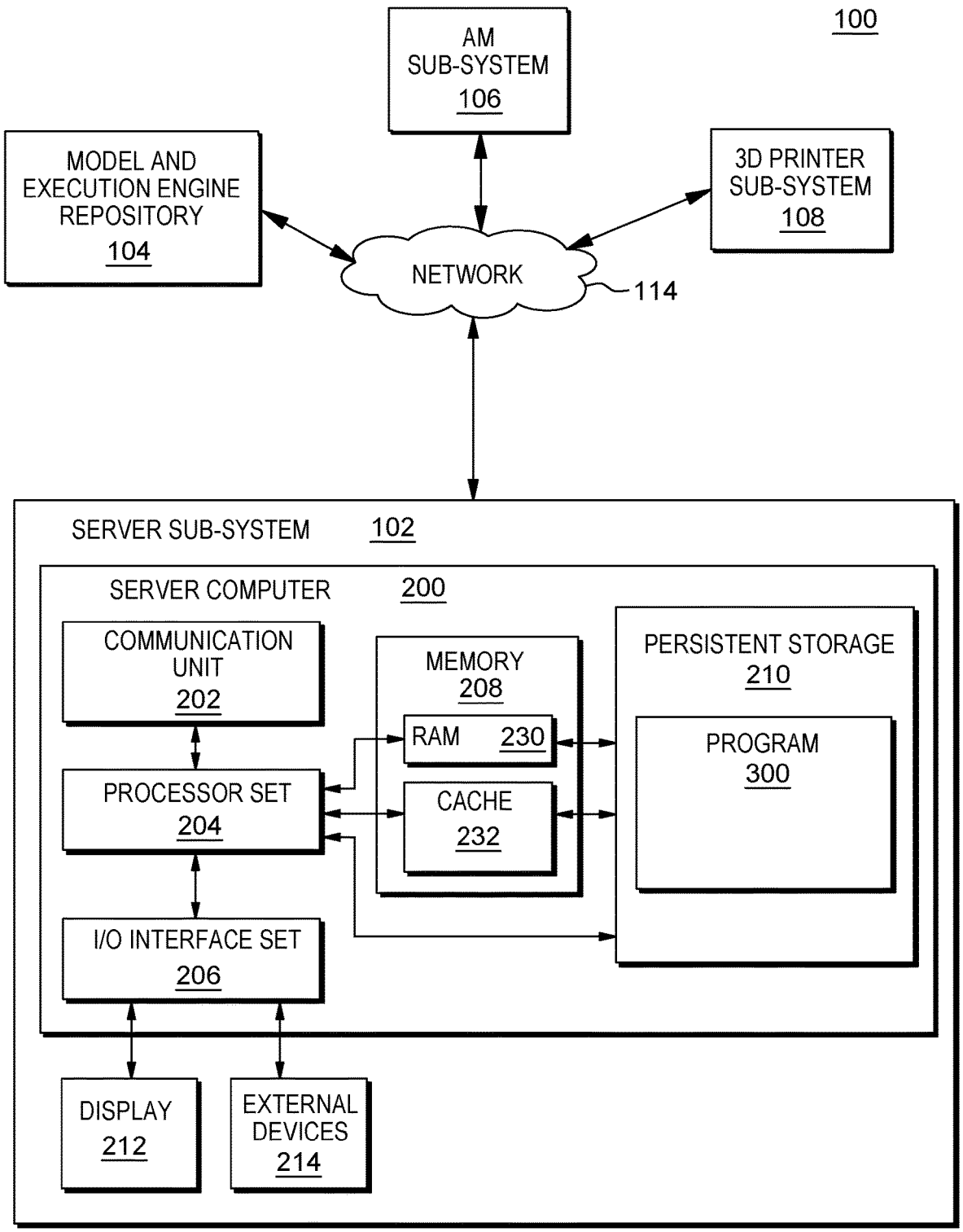
FIG. 1 is a block diagram view of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semi-conductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); model and execution engine repository 104; AM (additive manufacturing) sub-system 106; and 3D (three dimensional) printer sub-system 108; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through 277 a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
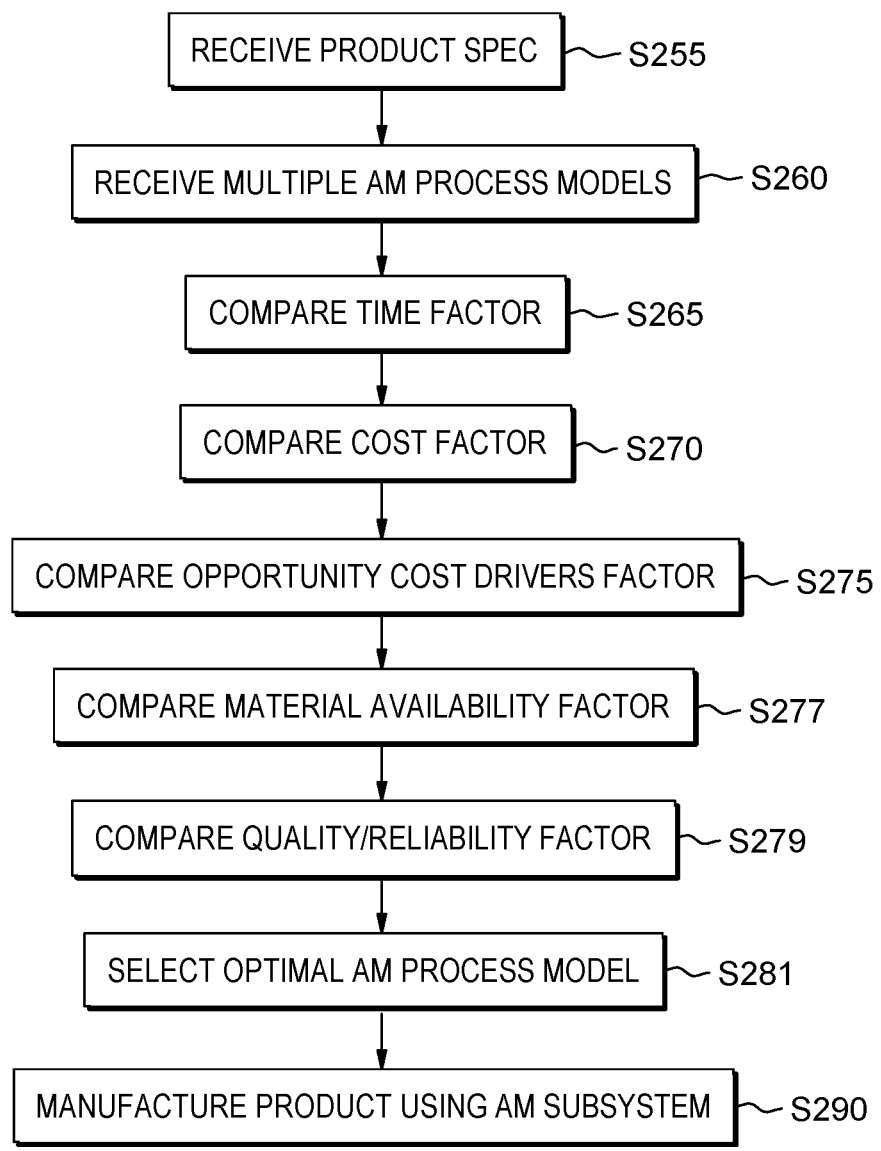
FIG. 2 is a flowchart showing a first embodiment method performed, at least in part, by the first embodiment system.
Figure 3:
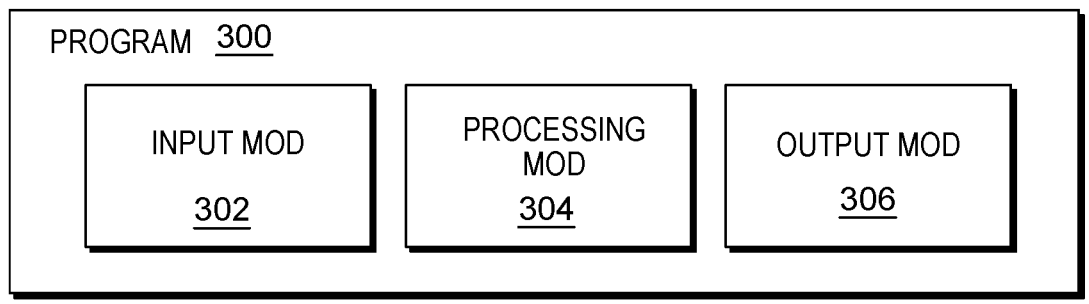
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where input module ("mod") 302 receives a data set that indicates a design for a physical part (for example, a gear or a forklift).

Processing proceeds to operation S260, where input mod 302 receives three "models" (herein referred to as first model, second model and third model) from model and execution repository 104. Each model represents a different additive manufacturing process that can be used to manufacture the physical part that is specified by the data received at operation S255.

Processing proceeds to operation S265, where processing mod 304 compares and evaluates manufacturing times entailed by each of the models.

Processing proceeds to operation S270, where mod 304 compares and evaluates manufacturing costs respectively entailed by each of the models.

Processing proceeds to operation S275, where mod 304 compares and evaluates opportunity costs respectively entailed by each of the models.

Processing proceeds to operation S277, where mod 304 compares and evaluates availability of materials (for example, raw materials for the physical part, materials expended by the manufacturing process itself) respectively entailed by each of the models.

Processing proceeds to operation S279, where mod 304 compares and evaluates quality/reliability of instantiations of physical parts that would be made under the manufacturing process of each given model.

Processing proceeds to operation S281, where mod 304 selects the optimal manufacturing process (and associated model and/or execution engine) for making instantiations of the physical part. In this example, the manufacturing process corresponding to the third model has been chosen.

Figure 4:
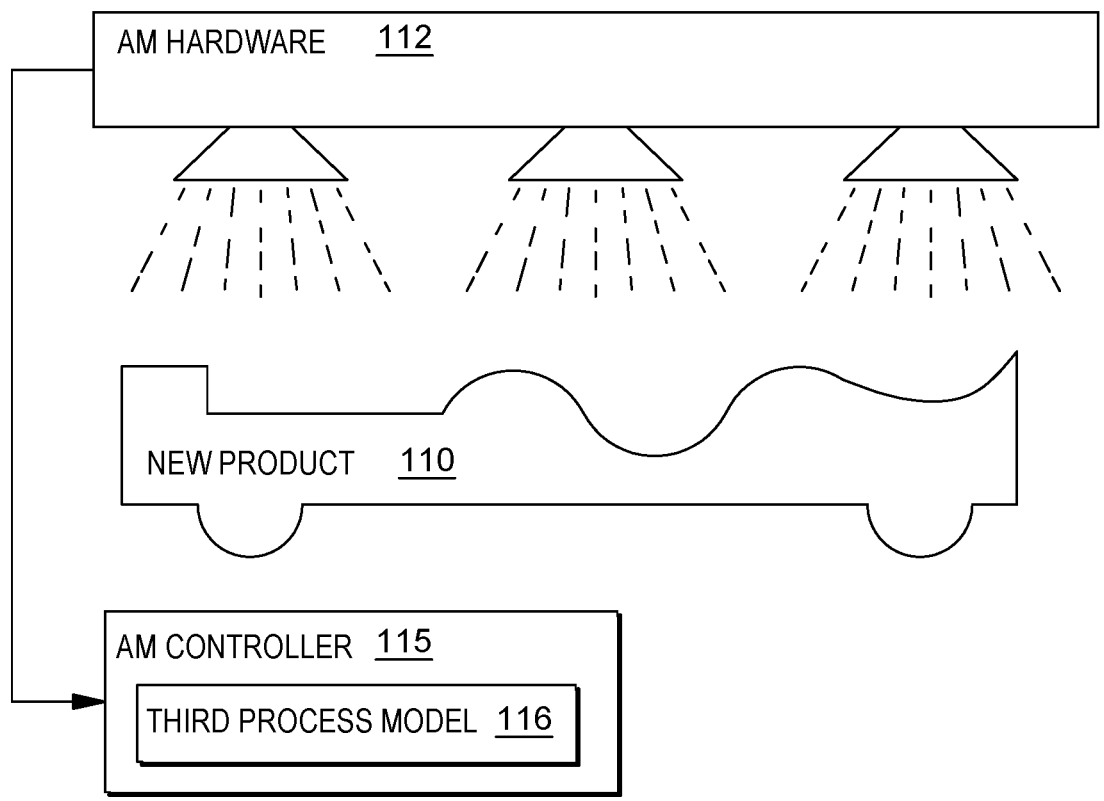
FIG. 4 is a screenshot view generated by the first embodiment system.

Processing proceeds to operation S290 where: (i) third model 116 is sent to additive manufacturing subsystem 106 (see FIG. 4), and (ii) an instantiation of the physical part is made by the selected, optimal additive manufacturing process. This is shown in FIG. 4, where additive manufacturing controller 115 controls additive manufacturing hardware 112 to make new product 110 using output mod 306, which is a physical instantiation of the product design received at operation S255.

III. Further Comments and/or Embodiments

Some embodiments of the present invention recognize the following facts, potential problems and/or potential areas for improvement with respect to the current state of the art: (i) in additive manufacturing space, there are multiple factors that can impact the outcome and its quality; (ii) manufactured part quality inconsistency is a major impediment in large scale adoption: and/or (iii) factors that could impact the additive manufacturing process include CAD (computer-aided design) designs and geometry of the part, topology, operating conditions (for example, spatiotemporal temperature distribution), and raw material source and type (for example, powder composition or powder size distribution).

Some embodiments of the present invention recognize the following facts, potential problems and/or potential areas for improvement with respect to the current state of the art: (i) in the manufacturing world, several common sub-components can lead to different end products. (for example, bearings can be used in a host of different end products); (ii) a manufacturer (the seller) may have perfected an approach to manufacture a subcomponent using AM after several trials and errors (such as predictive models and simulation models that can estimate outcome before printing the part); (iii) the knowledge and the insights the manufacturer has gained to build the subcomponent using AM can be of great value to other interested manufacturers; (iv) publishing the AM design and process is also a way for the manufacturer to monetize the additive manufacturing processes it has created; and/or (v) if a manufacturer (publisher) is looking to publish his unique AM process in a marketplace, there needs to be a way to determine the value of the process and make recommendations/ratings to other interested manufacturers to aid their decision making.

Some embodiments of the present invention recognize the following facts, potential problems and/or potential areas for improvement with respect to the current state of the art: (i) additionally, if another manufacturer (the buyer) is looking to leverage additive printing processes for a sub component that is commonly used, the person can get recommendations on the AM design that will best fit his input and operating conditions; and/or (ii) for example, if the manufacturer (buyer) wants to use AM to print bearings of a particular specification, he can leverage certified AM processes of other manufacturers (publishers) to make his AM steps easier. The following paragraphs, with two (2) use case examples, describe potential problems associated with current AM.

There are several applications of Additive Manufacturing with several vendors having their specific processes that achieve certain goals with respect to component strengthening, surface treatment and component re-profiling for use in multiple scenarios. The scenarios can be to repurpose an existing component to a new spare in a short time than building a new component, combining multiple material properties to achieve a certain goal for a component profile that can be achieved by a specialty manufacturer having a unique process that delivers the required component characteristics, adding a specific thickness and profile in a single manufacturing step, enhance an existing component re-surfacing the outer surface for different physical characteristics, etc. Two (2) specific use cases are mentioned below:

Use Case 1—Manufacturing of Spares out of Existing Spares/Alternate Components: sometimes in the industry, it may be easier to take an existing component, apply Additive Manufacturing (AM) on top of it and create a desired spare instead of manufacturing it from the scratch. Re-engineered component design for certain components might be necessitated for: (i) increased performance issues (increased power throughput for a short time); and (ii) increased strength or other material characteristics—a new layer can be added on top of an existing component/alternate component to reinforce its strength, for example, boring heads and mining excavation tools. There are a number of instances in component design and use, where variations of a component design are needed as replacements, with little design tweaks. This is common in industry to solve problems and can be beneficial when spares are not easily available or procuring spares is not time and cost effective. In such cases, there is a need to build by tweaking existing spares/components by applying AM.

Use Case 2—New Component variation: this is another application of AM where a variation of a component that is not in regular manufacturing is needed. This may be done to do very specific task (say a forklift is trying to lift a load that has an obstruction) or there is a particular issue to overcome like drilling/mining machine. Suppose instead of earth, a material like rock is encountered; which has different strength characteristics than the machine or the boring head is designed for. In such cases, it may be necessary to increase the delivered force (which might necessitate changing of gear ratios).

In addition, say one component in the machine has aged due to a number of out of profile events causing the component profile to be more worn out, so the power delivery/strength characteristics of the components have changed from the specs as given in the example below.

As an example, say a forklift has a design capacity of 1 ton, but it needs to lift say 1.1 ton. Though the additional 10% load may already be catered by the factor of safety built into the forklift, but suppose with age, the strength characteristics have decreased as the forklift has to cross over a small obstacle in the lift at the edge and several times there is a knock that provides a resisting force on the load gear teeth. In such cases: (i) a new forklift can be ordered and wait for it, which can cause significant delay; or (ii) change the reference gear ratio of the powerlift (with the implicit assumption that in addition to the material characteristics, the forklift is able to deliver the torque for the additional payload). So, suppose there is a need to add 4 more teeth to the existing gear to cater to the additional load. In this changed scenario, suppose there is a gear with 100 teeth of similar/slightly different radius. This needs to be refitted into a 104-teeth gear using some AM process.

In both the scenarios, say some other manufacturer (Manufacturer A) has the AM process and the software that can do that transformation to the gear, while the additional material can be procured from a different source. Manufacturer A has the process/simulation model that he may not want to share, but can share as an execution engine. So, there will be a need to integrate a method with the models from Manufacturer A, combining the AM method steps while also factoring in the different materials to be used and out of the profile operational parameters (operational qualities and constraints) which can be catered to.

Some embodiments of the present invention may include one, or more, of the following operations, features, characteristics and/or advantages referencing the scenario described in the paragraphs above: (i) take the Manufacturer A model catering to the in-profile requirements (model may have a security-wrapper in order to preserve its trade secret). The in-profile requirements are usually the generic variations that needs to be superimposed on a component to create a variation; and/or (ii) applies the following various implementation points: (a) required parameters (say AM material type) and out-of-profile parameter (say the forklift in addition to lifting the load would need to overcome a barrier which imparts a thrust, thereby requiring additional force) requirements, (b) execute multiple simulations to come up with AM computations for the current requirement that satisfies both the in-profile and out-of-profile parameters, (c) caters to other in-profile (normal operation) and out-of-profile events seen by Manufacturer A that are captured as operational out-of-profile instances and may be a library of tens/hundreds of events captured over several instances and time periods. For example, hitting an obstacle during movement, harder surface or piece while drilling/ surface treatment, etc., and/or (d) the calculation engine in the home organization can have the models used for simulating their equipment, but the new material properties from Manufacturer A that is in their secured model has to be invoked billions of times and so instead of service calls in pure SaaS (software as a service), the security wrapped model is shared for a limited time and functionality, embedding locally will be computationally more efficient. The model being able to integrate and recompute different combinations of raw components, the different AM processes from different specialty manufacturers, the changed physical properties and the operation in both in-profile and out-of profile events to determine which Manufacturer from set of manufacturers and which component from set of possible repurpose worthy components satisfy the requirements to make the recommendation using time, cost, opportunity cost drivers for selection.

The following two (2) paragraphs describe current technology with respect to differences with 3D printing.

3D Printing creates components or objects by spraying the composite material in layers in molds with or without strengthening framework. The sprays can be of different thicknesses. The overall structural strength can be measured when the structure or component is fully printed. Since layers of spray are overlaid, the underlying material bond structure is unique with stronger bonds in lateral planar surface and weaker bonds in the extruding or overlaying surface. This may not be amenable to certain components that would undergo shear forces which need that material in volume for a particular 3D space is put in together in all the three dimensions. Hence, 3D printing is not applicable to all types of component manufacturing.

Additive manufacturing primarily deals with increasing the surface of an existing component by overlaying layers with material used for bonding of layers having properties to create higher strength in the extruding or overlaying layers for some material types. However, based on the environment for pouring of the additive mixture for filling in a 3D space, different manufacturers can have created unique processes to create multiple profiles on top of base components with similar or dissimilar profiles. They would also have models of their process and subsequent material strength evaluation that can be made available in protected modes for others to incorporate into their models for computation of usage patterns.

Some embodiments of the present invention may include one, or more, of the following operations, features, characteristics and/or advantages: (i) enables efficiencies in the additive manufacturing process, both in rating and qualifying an AM process published, and in supporting interested buyers to select a method/process to address their specific needs; (ii) recommendations for rating a published process model that will be based on: (a) knowledge repository of similar AM processes, (b) usage history and outcome, (c) differences of proposed AM design with respect to other designs, (d) comparison with traditional manufacturing processes, (e) quality results published with proposed AM design such as structural stability and fit to design, (f) repeatability of the proposed AM design, (g) explain ability of recommendation with a knowledge graph, and/or (h) ability to incorporate feedback, proof of performance in new conditions based on market usage in the models; and/or (iii) recommending a design/process to interested manufacturers/ buyers will use a model based on: (a) output conditions of interested buyer (such as part type, design specs, of produced part), (b) operating conditions of interested buyer (such as planned AM process), (c) input parameters for process (such as planned RM source, powder type), (d) history of similar requirements and knowledge repository of available AM designs, (e) AM verses a traditional decision point, and/or (f) ability to capture proof of performance in different conditions as feedback to the model.

Some embodiments of the present invention may include one, or more, of the following operations, features, characteristics and/or advantages: (i) integration of deep simulation engineering models of protected process steps/information being used to compute the ability of the components modified by AM to be able to be used in the planned operation modes in either digital twin model or pure usage simulation (high frequency $10^{12}$ per second, small step size); (ii) re-use of components with different composition unused in inventory that can be used as a base for AM and assess suitability; (iii) running multiple simulations across vendors (multiple manufacturers may provide their processes and models to create the component) to assess the best available option to create the new component using AM, which will cut down the time to create the replacement/spare; (iv) out of profile events may drive the suitability of one manufacturing process against others; (v) existing profile surface being prepared for laying of the additional material to reinforce required strength such as in each tooth of a gear; (vi) creating a canal for the new material to flow in building the bonding strength and simulating the buildup using the vendor's secured models; and/or (vii) checking the strength while simulating out of profile events likely to occur.

Figure 5:
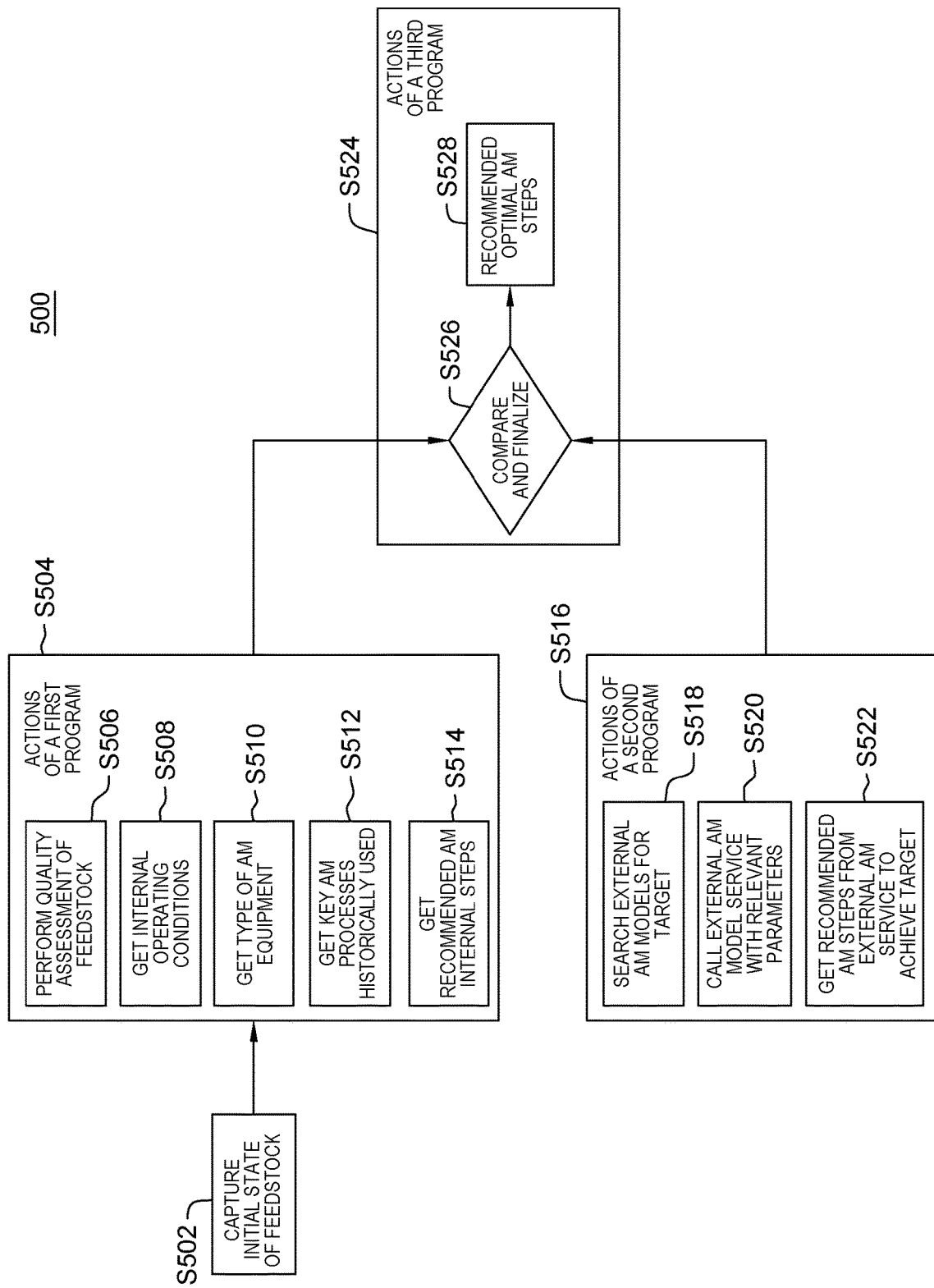
FIG. 5 is a flowchart showing a second embodiment of method according to the present invention.

As shown is FIG. 5, flowchart 500 includes: capture initial state of feedstock S502; actions of a first program S504; actions of a second program S516; and actions of a third program S524. Actions of a first program S504 include: perform quality assessment of feedstock block S506; get internal operating conditions block S508; get type of AM equipment block S510; get key AM processes historically used block S512; and get recommended AM internal steps block S514. Actions of a second program S516 include: search external AM models for target block S518; call external AM model service with relevant parameters block S520; and get recommended AM steps from external AM service to achieve target block S522. Actions of a third program S524 includes: compare and finalize decision block S526; and recommended optimal AM steps block S528.

Some embodiments of the present invention may include one, or more, of the following operations, features, characteristics and/or advantages: (i) includes a platform of various AM processes from different entities that can be applied to a given intermediate available component to build the required product with a comparison of the different available AM processes to rank, based on the product's likely parameters achievable; (ii) uses differences to the product parameters from the different AM processes using a knowledge graph; (iii) incorporates performance feedback to update the different AM processes' capabilities by finding the differences between simulated performance and actual performance; (iv) there is no product redesign required to match the process; (v) each entity allows the requestor's AM based product modeler to connect to the AM process modeler of the manufacturing entity; (vi) operates in a secure fashion to determine the AM process modeler's method to build the final product/profile; (vii) determines if the required physical parameters—profile, strength, shear force, surface hardness and others, will be met; and/or (viii) determines weather during a final product use simulation with non-linear effects, the product can deliver the performance.

Some embodiments of the present invention may include one, or more, of the following operations, features, characteristics and/or advantages: (i) include rating a set of published processes and methods by different AM manufacturers that can be used to take the given available intermediate product and create the final product using applicable AM processes from the database; (ii) compares the process impact on the final product among the AM processes or the parameters that the final product will exhibit; (iii) includes a method to explain how the final product will have the specified performance parameters which can be built from the AM process characterization; (iv) incorporates feedback, proof of performance of the model under different conditions, and repeatability of design; and/or (v) includes a method for product and process simulators meshing or linking together that will generate the product characteristics or show the AM developed product's performance.

Some embodiments of the present invention may include one, or more, of the following operations, features, characteristics and/or advantages: (i) determines what is out of the buyer conditions profile that the AM developed product, from an intermediate component, has to operate and if it will perform and influence the process model selection or comparison with traditional methods; (ii) describes capturing proof of performance in different conditions as feedback to the model; and/or (iii) considers the operating conditions to be met by the final product design and how the AM 3D printing process contributes to the final physical performance parameters of the product.

Some embodiments of the present invention may include one, or more, of the following operations, features, characteristics and/or advantages: (i) looks at a platform where different AM processes are compared based on the product that they can build from intermediate components and if the resulting physical characteristics of the product meets the needed specification for operation in out of profile situations using a knowledge graph that is verified through a combined simulation of the product and the process model of the AM process where this process model is provided in a secured way to protect any confidentiality in the additive manufacturing process(es) involved while meeting the high frequency needs of the combined simulation that could be executed in containerized secure environments; (ii) suggests: (a) a recommended ratings for products built using different process models based on different conditions as explained above, and/or (b) recommends a model for a customer to use based on their specific requirement, operating conditions, and feedstock; (iii) enables sharing of process models with multiple subscribers (customers) to apply process simulation by feeding in operational (in-profile) and out of profile parameters; (iv) includes a system that can accept the recommended model and use it as an executable to do process simulation; and/or (v) can determine the feasibility or fitment of the manufactured product to the customer requirement using the product and process (of building the product from an intermediate product) linked simulation model.

Some embodiments of the present invention may include one, or more, of the following operations, features, characteristics and/or advantages: (i) compares the AM with traditional methods to determine what is suitable under given circumstances; (ii) determines what is out of the buyer's profile component operating conditions in model selection or comparison with traditional methods; and/or (iii) describes capturing proof of performance in different conditions as feedback to the model.

Some embodiments of the present invention may include one, or more, of the following operations, features, characteristics and/or advantages: (i) describes a method of identifying and proposing process models across customers, users, manufacturers or marketplace to apply the AM process simulation by feeding in operational (in-profile) and out of profile parameters, base raw material(s), or a product to be transformed by AM to the desired output; (ii) includes simulation factors in model ratings, proof of performance, repeatability, etc.; (iii) explains with a knowledge graph the performance of the selected models and the factors leading to the selection of the same; (iv) the system can accept the client models and use it as an executable to do high volume process simulation to come up with alternatives for selecting a process, explaining it with a knowledge graph, and ensuring adherence to operating and out of profile condition; (v) provides a rating mechanism for model selection; (vi) focusses on selecting a process for transforming a raw material or other semi-finished/finished product into a new and modified product respectively; and/or (vii) describes a method to build to incorporate output conditions of the buyer, history of similar requirements augmented with in the profile and out of the profile parameters in the AM process evaluation.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A manufacturing process for remanufacturing a gear component of a machine with the gear component defining a gear ratio characteristic of the machine, the process comprising:
   receiving a product specification data set including information indicative of a first gear design that defines a first gear ratio when used in the machine;
   receiving a manufacturing process data set including information indicative of an additive manufacturing process that may be used to transform a first gear made according to the first gear design by adding at least one gear tooth to the first gear to convert the first gear into a second gear made according to a second gear design that defines a second gear ratio when used in the machine;
   using the manufacturing process data set to convert the first gear which has physical existence and is made according to the first gear design into a second gear, which has physical existence and is made according to the second gear design; and
   physically installing the second gear in the machine to operate the machine at the second gear ratio in order to repurpose the first gear.

2. The manufacturing process of claim 1 wherein the machine is a drill for boring into the earth and the gear is used in a powertrain of the drill.

3. The manufacturing process of claim 1 wherein the machine is a forklift for lifting and transporting loads and the gear is used in a powerlift assembly of the forklift.

4. The manufacturing process of claim 1 wherein the first gear design has a different gear radius than the second gear design.

* * * * *